US008888623B2

(12) United States Patent
Sato et al.

(10) Patent No.: US 8,888,623 B2
(45) Date of Patent: Nov. 18, 2014

(54) AUTO-TENSIONER

(75) Inventors: Seiji Sato, Iwata (JP); Satoshi Kitano, Iwata (JP)

(73) Assignee: NTN Corporation, Osaka (JP)

( * ) Notice: Subject to any disclaimer, the term of this patent is extended or adjusted under 35 U.S.C. 154(b) by 1520 days.

(21) Appl. No.: 12/216,367

(22) Filed: Jul. 2, 2008

(65) Prior Publication Data
US 2009/0011880 A1   Jan. 8, 2009

(30) Foreign Application Priority Data

Jul. 3, 2007   (JP) ................................. 2007-175130
Jul. 17, 2007   (JP) ................................. 2007-185454

(51) Int. Cl.
*F16H 7/22*   (2006.01)
*F16H 7/08*   (2006.01)

(52) U.S. Cl.
CPC ...... *F16H 7/0848* (2013.01); *F16H 2007/0857* (2013.01); *F16H 2007/0806* (2013.01)
USPC .......................................... 474/110; 474/109

(58) Field of Classification Search
USPC .......................................... 474/110, 111, 112
See application file for complete search history.

(56) References Cited

U.S. PATENT DOCUMENTS

| | | | | |
|---|---|---|---|---|
| 3,263,983 | A | * | 8/1966 | Bliven ............................ 267/220 |
| 3,802,286 | A | * | 4/1974 | Winklhofer et al. ............ 474/111 |
| 4,371,360 | A | * | 2/1983 | Ojima et al. .................... 474/111 |
| 4,395,251 | A | * | 7/1983 | King et al. ...................... 474/111 |
| 4,425,104 | A | * | 1/1984 | Ojima ............................. 474/111 |
| 4,466,802 | A | * | 8/1984 | Ojima et al. .................... 474/138 |
| 4,472,161 | A | * | 9/1984 | Ojima ............................. 474/111 |
| 4,507,103 | A | * | 3/1985 | Mittermeier .................... 474/110 |
| 4,527,462 | A | * | 7/1985 | Okabe ............................... 92/51 |
| 4,642,995 | A | * | 2/1987 | Bachler et al. ...................... 62/6 |
| 4,702,726 | A | * | 10/1987 | Ojima et al. .................... 474/101 |

(Continued)

FOREIGN PATENT DOCUMENTS

| | | |
|---|---|---|
| JP | 58-112759 | 8/1983 |
| JP | 63-68550 | 5/1988 |
| JP | 2000-291750 | 10/2000 |
| JP | 2007-032603 | 2/2007 |

OTHER PUBLICATIONS

Notice of Reasons for Rejection (with partial English translation issued Oct. 25, 2011 in corresponding Japanese Application No. 2007-175130.

*Primary Examiner* — Henry Liu
(74) *Attorney, Agent, or Firm* — Wenderoth, Lind & Ponack, L.L.P.

(57) ABSTRACT

An auto-tensioner includes a plunger slidably inserted in a cylinder and having a closed front end protruding from the cylinder and an open rear end which is located in the cylinder. The plunger is formed with an internal thread on its inner periphery. A screw rod having an external thread formed on its outer periphery thereof and inserted in the plunger with its external thread in threaded engagement with the internal thread of the plunger. The screw rod has a rear end protruding from the open rear end of the plunger. A seat member is mounted in the cylinder and in abutment with the rear end of the screw rod. A return spring having one end thereof supported by the screw rod biases the plunger outwardly of the cylinder to press the closed front end of the plunger against a chain or a belt. An elastic member which is compressible in the axial direction of the cylinder supports the seat member.

9 Claims, 7 Drawing Sheets

(56) References Cited

U.S. PATENT DOCUMENTS

| | | | |
|---|---|---|---|
| 4,727,529 A * | 2/1988 | Araki et al. | 369/44.32 |
| 4,772,251 A * | 9/1988 | Goppelt et al. | 474/101 |
| 4,790,801 A * | 12/1988 | Schmidt et al. | 474/110 |
| 4,792,322 A * | 12/1988 | Goppelt et al. | 474/136 |
| 4,823,835 A * | 4/1989 | Chu | 137/557 |
| 4,850,941 A * | 7/1989 | Sosson | 474/110 |
| 4,863,417 A * | 9/1989 | Kimata et al. | 474/101 |
| 4,934,984 A * | 6/1990 | Ojima | 474/111 |
| 4,940,447 A * | 7/1990 | Kawashima et al. | 474/110 |
| 5,073,150 A * | 12/1991 | Shimaya | 474/110 |
| 5,234,383 A * | 8/1993 | Harada et al. | 474/110 |
| 5,259,820 A * | 11/1993 | Mott | 474/110 |
| 5,277,664 A * | 1/1994 | Mott | 474/110 |
| 5,494,090 A * | 2/1996 | Kejha | 152/310 |
| 5,658,212 A * | 8/1997 | Meurer et al. | 474/110 |
| 5,713,809 A * | 2/1998 | Yamamoto et al. | 474/110 |
| 5,860,881 A * | 1/1999 | Tada | 474/110 |
| 5,879,256 A * | 3/1999 | Tada | 474/110 |
| 5,913,742 A * | 6/1999 | Nakamura et al. | 474/110 |
| 5,951,423 A * | 9/1999 | Simpson | 474/109 |
| 5,961,410 A * | 10/1999 | Yamamoto | 474/110 |
| 6,196,939 B1 * | 3/2001 | Simpson | 474/110 |
| 6,361,458 B1 * | 3/2002 | Smith | 474/109 |
| 6,450,908 B2 * | 9/2002 | Ishii et al. | 474/138 |
| 6,758,775 B2 * | 7/2004 | Heinrich et al. | 474/19 |
| 7,727,098 B2 * | 6/2010 | Sato et al. | 474/111 |
| 7,766,775 B2 * | 8/2010 | Sato et al. | 474/138 |
| 2002/0173392 A1 * | 11/2002 | Doi et al. | 474/209 |
| 2003/0181273 A1 * | 9/2003 | Nakagawa et al. | 474/101 |

* cited by examiner

AUTO-TENSIONER

BACKGROUND OF THE INVENTION

This invention relates to an auto-tensioner used to keep constant the tension of mainly a timing chain or a timing belt for driving engine camshafts.

Ordinarily, the rotation of a crankshaft of an engine is transmitted to camshafts through a timing chain or a timing belt (in the following description, only the timing chain is discussed) to rotate the camshafts, thereby selectively opening and closing the valves for combustion chambers.

An auto-tensioner is ordinarily used to keep constant the tension of the chain. One known auto-tensioner includes a cylinder having an open front end, a plunger axially slidably inserted in the cylinder and having a closed front end and an open rear end which is located inside the cylinder, and a screw rod having an external thread formed on the outer periphery thereof and in threaded engagement with an internal thread formed on the inner periphery of the plunger. The screw rod has a rear end protruding from the open rear end of the plunger and in abutment with a seat member provided in the cylinder. The plunger is biased outwardly of the cylinder by a return spring having one end thereof supported by the screw rod, thereby pressing the front end of the plunger, which protrudes from the cylinder, against the chain or belt (see JP Patent Publication 2007-32603A).

While the engine is running, the plunger of this auto-tensioner moves back and forth within the range of the clearance between the internal and external threads, thereby absorbing vibrations of the chain. When the tension of the chain changes, the plunger slowly turns while moving back and force within the range of the clearance between the internal and external threads, and moves to a position where the biasing force of the return spring balances with the tension of the chain.

When the engine is stopped, according to the positions of the cams when they stop, the tension of the chain may be higher than the force of the return spring. But while the engine is at a stop, since the chain does not vibrate, the plunger does not move. Thus, when the engine is restarted, the chain is less like to slacken, so that the engine starts smoothly.

But since the moving speed of the plunger of this auto-tensioner is low when the plunger is pushed into the cylinder beyond the range of the clearance between the internal and external threads, if the amplitude of vibration of the chain is large due to a large change in torque of the crankshaft, a large change in rotational resistance of the camshafts or resonance of the engine during one combustion cycle, it may be impossible to absorb vibrations of the chain, thus resulting in over-tensioning of the chain.

Also, since the moving speed of the plunger of this auto-tensioner is low when the tension of the chain changes, if the travel path of the chain changes markedly due to thermal expansion of the engine block, it may be impossible to absorb such a change in the travel path of the chain, thus resulting in over-tensioning of the chain.

An object of this invention is to provide an auto-tensioner which can minimize the possibility of over-tensioning of the chain even if the chain vibrates markedly or the travel path of the chain changes markedly.

SUMMARY OF THE INVENTION

In order to achieve this object, the present invention provides an auto-tensioner comprising a cylinder having an open front end, a plunger axially slidably inserted in the cylinder, the plunger having a closed front end protruding from the cylinder and an open rear end which is located in the cylinder, and being formed with an internal thread on an inner periphery thereof, a screw rod having an external thread formed on an outer periphery thereof and inserted in the plunger with the external thread thereof in threaded engagement with the internal thread of the plunger, the screw rod having a rear end protruding from the open rear end of the plunger, a seat member mounted in the cylinder and in abutment with the rear end of the screw rod, a return spring having one end thereof supported by the screw rod and biasing the plunger outwardly of the cylinder, whereby the closed front end of the plunger presses a chain or a belt, and an elastic member which is compressible in the axial direction of the cylinder and supporting the seat member.

With this arrangement, by compressing the elastic member, it is possible to push the plunger into the cylinder beyond the range of the clearance between the internal and external threads. Thus, even if the chain vibrates with a large amplitude, or the travel path of the chain changes markedly, it is possible to prevent over-tensioning of the chain, and thus to prolong the life of the chain.

Preferably, the seat member is rotationally fixed to the cylinder. With this arrangement, since the screw rod never rotates even when the plunger rotates, the axial position of the plunger stabilizes compared to the arrangement in which the seat member is not rotationally fixed to the cylinder.

Preferably, the auto-tensioner further comprises a holder holding the elastic member in a compressed state. With this arrangement, because the elastic member is compressed beforehand by the holder, the elastic member is further compressed only after the tension of the chain has exceeded the load corresponding to the amount of compression by the holder. Thus, while the vibration amplitude of the chain is small, the elastic member is less likely to resonate, which serves to stabilize the tension of the chain.

The holder may comprise a bottom plate supporting an axial end surface of the elastic member, side pieces extending axially from an outer edge of the bottom plate, the side pieces having their free ends bent to form engaging pieces for restricting the movement of the seat member.

The elastic member may be a spring. The spring may comprise corrugated washers and flat washers that are alternately superposed on each other.

The cylinder is preferably formed with an oil inlet for introducing engine oil that has splashed outside the cylinder into the cylinder. With this arrangement, it is possible to lubricate the portions of the internal and external threads that are in threaded engagement with each other with oil introduced into the cylinder through this oil inlet. Preferably, a film for preventing formation of a lubricating film comprising an oil additive is formed on the surface of at least one of the internal and external threads. Such a film may be a diamond-like carbon film.

In one arrangement, each of the internal thread and the external thread has a pressure flank for supporting a pushing force applied to the plunger in a direction to push the plunger into the cylinder, and a clearance flank, the pressure flank having a flank angle larger than the clearance flank.

In a further arrangement, the plunger comprises a tubular member having an open front end protruding from the cylinder and a closed rear end, and having an inner periphery on which the internal thread is formed, and a lid member fixed to the open front end of the tubular member.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
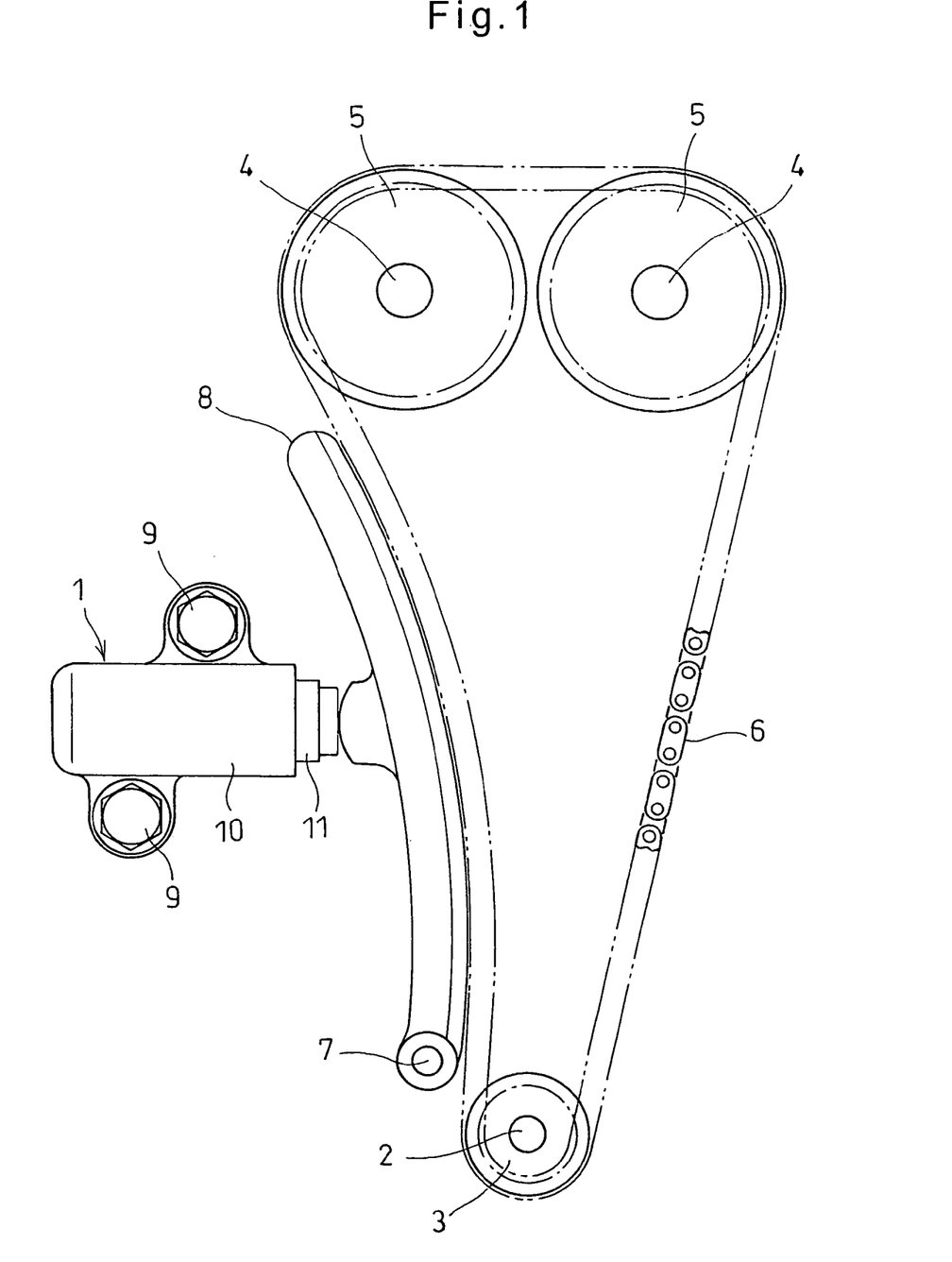
FIG. 1 is a front view of a chain transmission device including an auto-tensioner according to a first embodiment of the present invention.

FIG. 1 shows a chain transmission device including the auto-tensioner according to the first embodiment of the present invention. This chain transmission device further includes a sprocket 3 fixed to a crankshaft 2 of an engine, sprockets 5 fixed to respective camshafts 4, and a chain 6 through which the sprockets are coupled together. The rotation of the crankshaft 2 is therefore transmitted to the camshafts 4 through the chain 6, thereby opening and closing the valves (not shown) of combustion chambers by the rotation of the camshafts 4.

The auto-tensioner 1 presses the chain 6 through a chain guide 8 pivotable about a shaft 7. The auto-tensioner 1 is fixed to an engine block (not shown) by bolts 9.

Figure 2:
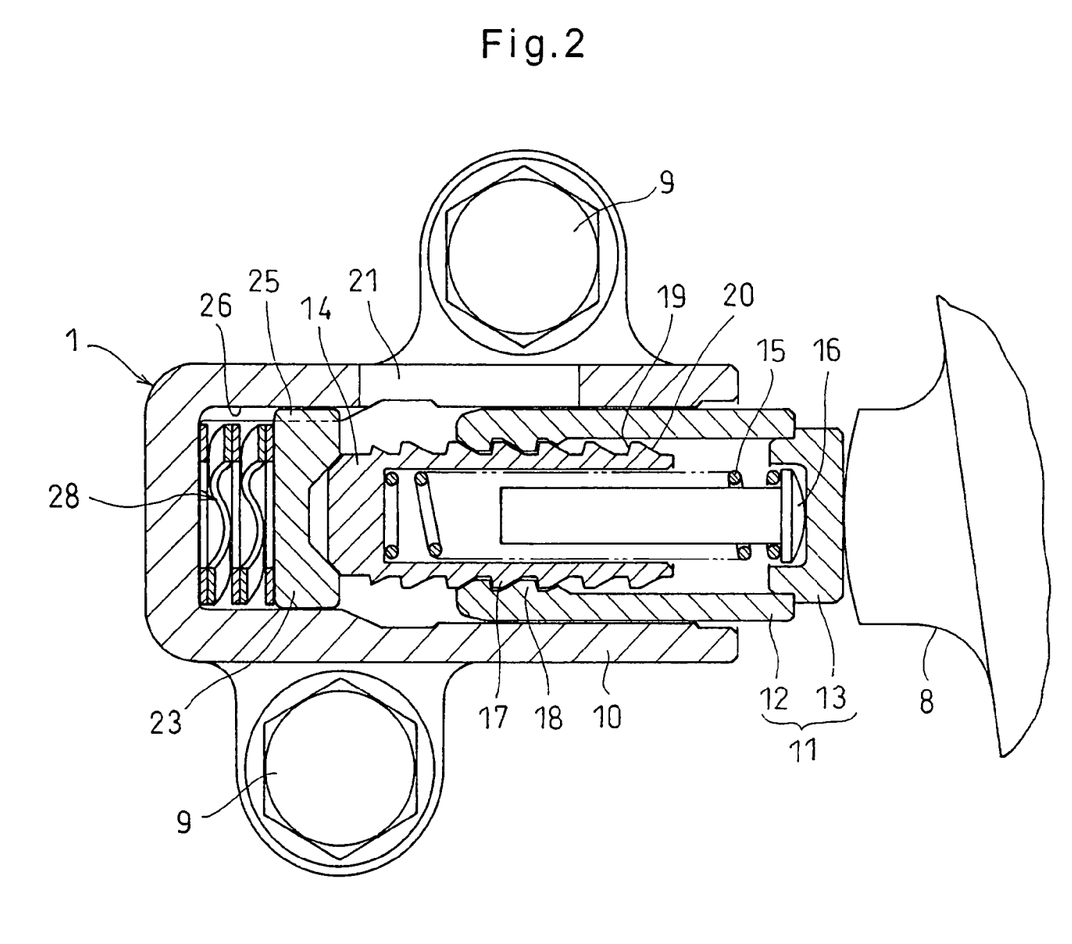
FIG. 2 is an enlarged sectional view of the auto-tensioner of FIG. 1.

As shown in FIG. 2, the auto-tensioner 1 includes a cylinder 10 having an open front end and a closed rear end, and a plunger 11 axially slidably inserted in the cylinder 10. The plunger 11 comprises a tubular member 12 having front and open rear ends, and a lid member 13 fixed to and closing the open front end of the tubular member 12, which protrudes from the cylinder 10. A screw rod 14 is inserted in the plunger 11 with its rear end protruding from the rear end of the plunger 11, which is located in the cylinder 10.

A return spring 15 is mounted between the lid member 13 and the screw rod 14. In particular, the return spring 15 has one end thereof supported by the screw rod 14 with the other end thereof pressing the lid member 13 through a spring seat 16, thereby biasing the plunger 11 outwardly of the cylinder 10. The end of the plunger 11 protruding from the cylinder 10 thus abuts the chain guide 8.

The screw rod 14 has on its outer periphery an external thread 17 that is in threaded engagement with an internal thread 18 formed on the inner periphery of the tubular member 12. Each of the external thread 17 and the internal thread 18 has a pressure flank 20 having a larger flank angle than a clearance flank for supporting the force that tends to push the plunger 11 into the cylinder 10. Thus, the threads 17 and 18 have a serration-shaped longitudinal section.

The cylinder 10 is formed with an oil inlet 21 for introducing engine oil that has splashed outside the cylinder 10 into the cylinder 10. The engine oil introduced into the cylinder 10 through the oil inlet 21 serves to lubricate between the external and internal threads 17 and 18.

Figure 5:
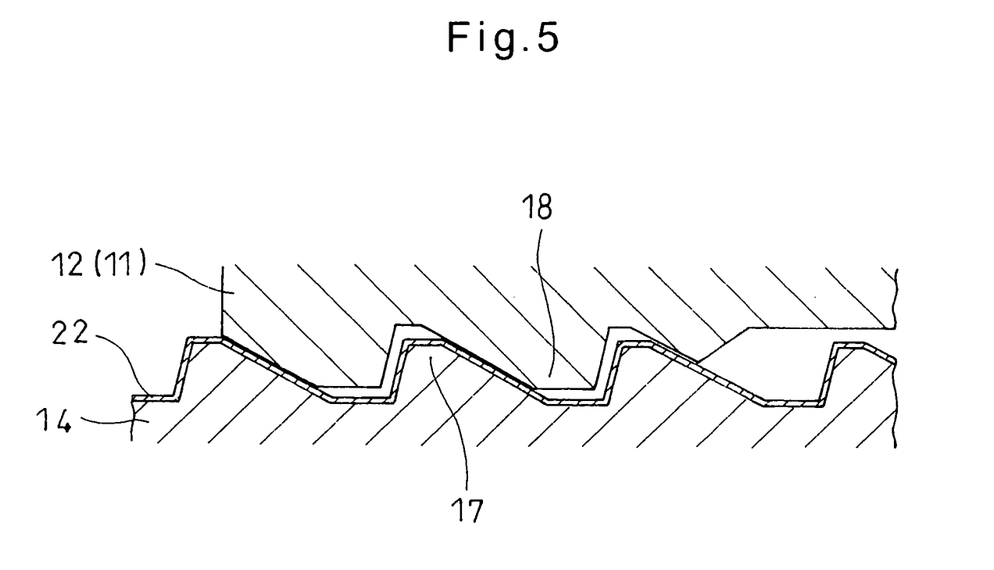
FIG. 5 is a partial enlarged sectional view of the auto-tensioner of FIG. 2, showing the outer peripheral portion of its screw rod.

As shown in FIG. 5, a diamond-like carbon film (hereinafter referred to as "DLC film") 22 is formed on the surface of the external thread 17. The DLC film 22 prevents the formation of a lubricating film of oil additives on the surface of the external thread 17.

Figure 3:
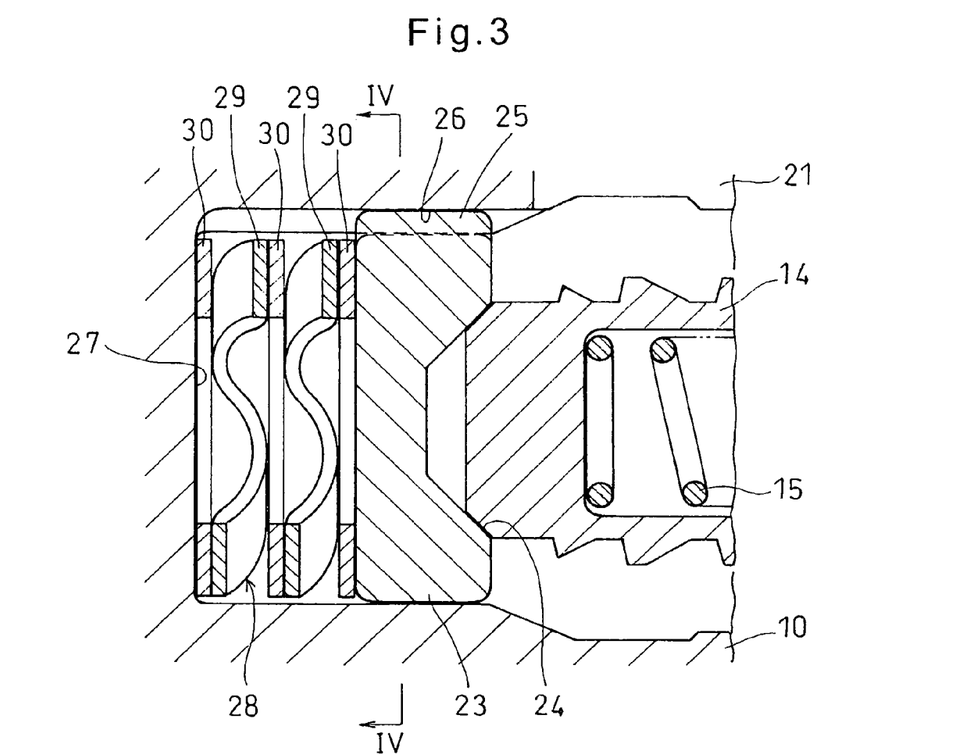
FIG. 3 is a partial enlarged sectional view of the auto-tensioner of FIG. 2, showing its seat member.
Figure 4:
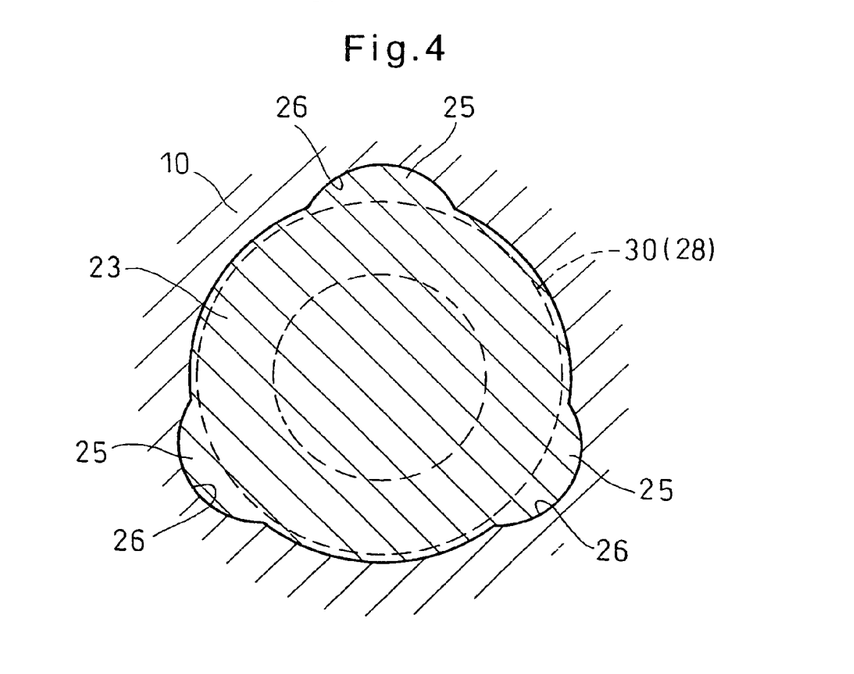
FIG. 4 is a sectional view taken along line IV-IV of FIG. 3.

As shown in FIG. 3, the screw rod 14 has its rear end, which protrudes from the plunger 11, in abutment with a seat member 23 axially slidably inserted in the cylinder 10. The seat member 23 has a tapered surface 24 of which the diameter increases toward the screw rod 14. By supporting the screw rod 14 on the tapered surface 24, the screw rod 14 is kept coaxial with the cylinder 10. As shown in FIG. 4, the seat member 23 has protrusions 25 formed on its outer periphery and engaged in axial grooves 26 formed in the inner periphery of the cylinder 10, thereby preventing rotation of the seat member 23 relative to the cylinder 10.

As shown in FIG. 3, the seat member 23 is supported by a spring 28 disposed between the seat member 23 and the bottom 27 of the cylinder 10. The spring 28 comprises axially disposed corrugated washers 29 formed by corrugating annular thin plates, and annular flat washers 30 disposed between the adjacent washers 29. The spring 28 is axially compressible by deforming the corrugated washers 29.

While the engine is running, the plunger 11 of the auto-tensioner 1 repeatedly moves back and forth within the range of the clearance between the external and internal threads 17 and 18, thus absorbing vibrations of the chain 6. When the tension of the chain 6 changes, the plunger 11 repeatedly moves back and forth within the range of the clearance between the external and internal threads 17 and 18, and simultaneously moves slowly while rotating until the biasing force of the return spring 15 balances with the tension of the chain 6.

If the amplitude of vibration of the chain 6 exceeds the clearance between external thread 17 and the internal thread 18 due to a large change in torque of the crankshaft 2, a large change in rotational resistance of the camshafts 4 or resonance of the engine during one combustion cycle, the spring 28 is compressed, thereby absorbing vibrations of the chain 6 and also preventing over-tensioning of the chain 6.

If the travel path of the chain 6 changes markedly due to thermal expansion of the engine block, too, the spring 28 is compressed, thereby absorbing such a change in the travel path of the chain 6 and preventing over-tensioning of the chain 6.

When the engine is stopped, depending upon the positions of the cams (not shown) on the camshafts 4 when they stop, the tension of the chain 6 may be larger than the biasing force of the return spring 15. But since the chain 6 does not vibrate while the engine is at a stop, the plunger 11 cannot rotate relative to the screw rod 14. Thus, when the engine is restarted, the chain 6 is less likely to slacken, so that the engine can be started smoothly.

Because the seat member 23 is supported by the spring 28, it is possible to push the plunger 11 into the cylinder 10 by a distance greater than the clearance between the external thread 17 and the internal thread 18 by compressing the spring 28. Thus, even if the chain 6 vibrates with large amplitude, or if the travel path of the chain 6 changes markedly, it is possible to prevent over-tensioning of the chain, thereby preventing shortening of the life of the chain 6.

Since the seat member 23 is prevented from rotating relative to the cylinder 10, even if the spring 28 rotates when compressed, such rotation of the spring 28 is not transmitted to the screw rod 14. Thus, compared to an arrangement in which the seat member 23 is not rotationally fixed to the cylinder 10, the axial position of the plunger 11 stabilizes, which leads to improved operational reliability of the auto-tensioner.

Since engine oil splash is introduced into the cylinder 10 through the oil inlet 21 formed in the outer periphery of the cylinder 10 at its upper portion, it is not necessary to supply engine oil into the cylinder by means of an oil pump (not shown) of the engine, which in turn makes it possible to reduce the capacity of the oil pump and thus its cost.

Because the DLC film 22 is formed on the surface of the external thread 17, even if engine oil contains molybdenum dithiocarbamate (MoDTC) or molybdenum dithiophosphate (MoDTP), the DLC film prevents the formation a lubricating film containing molybdenum disulphide ($MoS_2$) on the surface of the external thread 17, thereby reliably preventing slipping between the pressure flanks 20 of the external thread 17 and the internal thread 18 when the tension of the chain 6 increases.

Since the pressure flank 20 of each of the internal and external threads has a larger flank angle than its clearance flank, it is possible to reduce the surface pressure on the pressure flanks 20 when the tension of the chain is supported by the external thread 17 and the internal thread 18. This improves the durability of the auto-tensioner 1.

Since the plunger 11 comprises the tubular member 12 and the lid member 13, the internal thread 18 can be formed easily and thus at a low cost.

In this embodiment, the DLC film 22 is formed on the surface of the external thread 17. But the DLC film 22 may be formed on the surface of the internal thread 18. That is, it is important to form such a DLC film on the surface of at least one of the external thread 17 and the internal thread 18.

Figure 6:
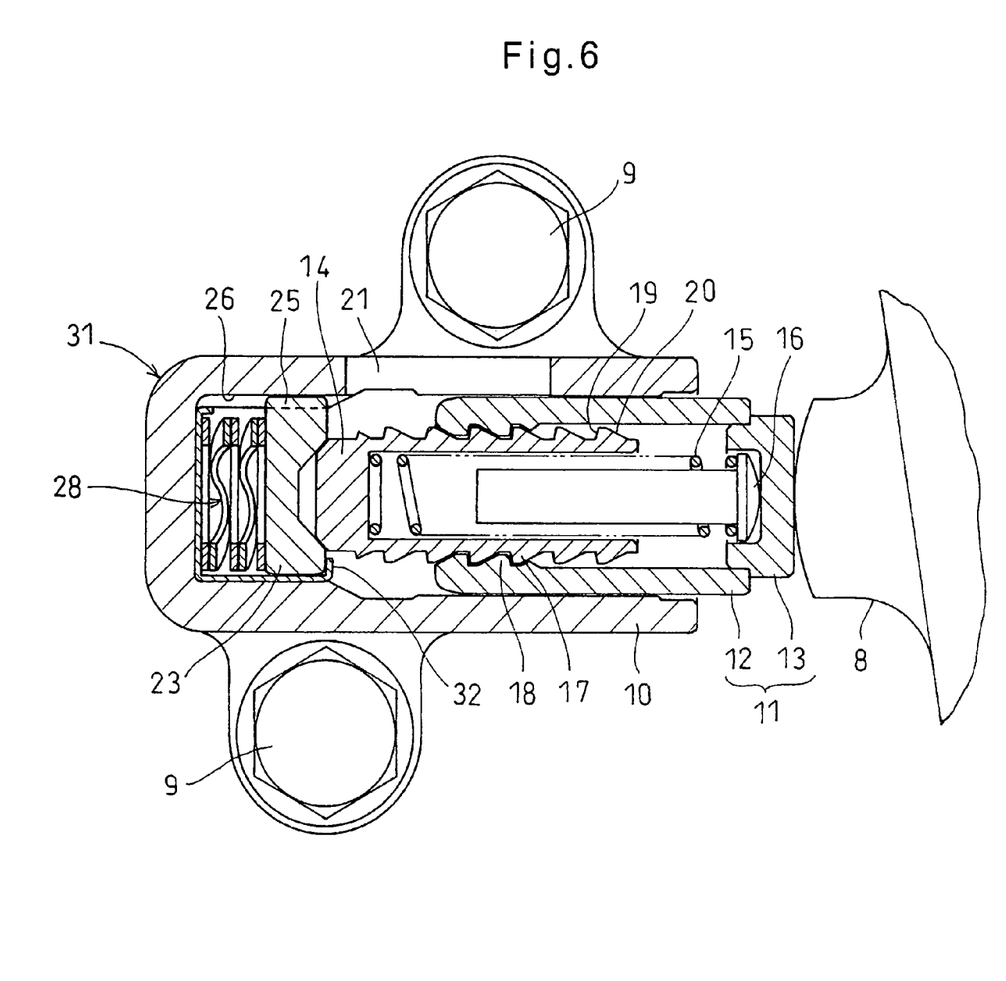
FIG. 6 is an enlarged sectional view of an auto-tensioner according to a second embodiment of the present invention.
Figure 7:
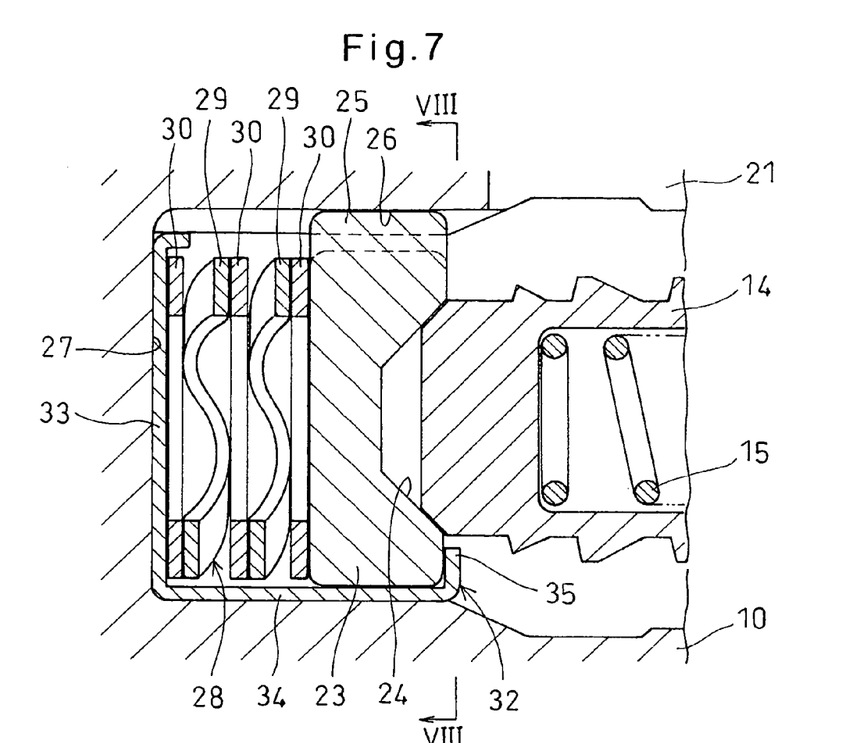
FIG. 7 is a partial enlarged sectional view of the auto-tensioner of FIG. 6, showing its seat member.
Figure 8:
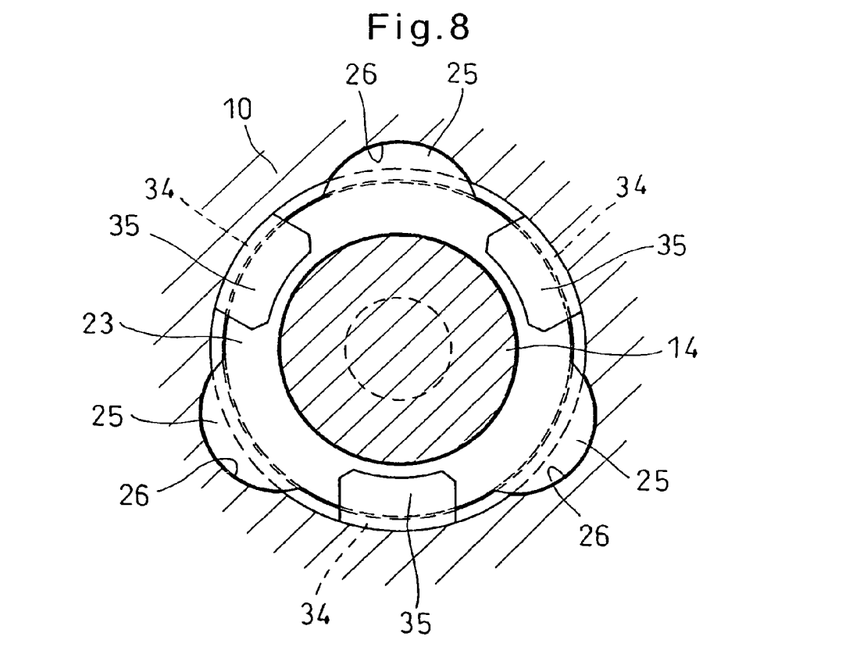
FIG. 8 is a sectional view taken along line VIII-VIII of FIG. 7.

FIGS. 6 to 8 show an auto-tensioner 31 according to the second embodiment of the present invention. Elements corresponding to those of the first embodiment are denoted by identical numerals and their description is omitted.

The spring 28 is held by a holder 32 in a compressed state. As shown in FIG. 7, the holder 32 comprises a bottom plate 33 supporting the rear axial end surface of the spring 28, and a plurality of side pieces 34 extending axially from the outer edge of the bottom plate 33. The side pieces 34 have their free ends bent radially inwardly to form engaging claws 35. The engaging claws 35 restrict the movement of the seat member 23 in a direction that allows expansion of the spring 28, thereby keeping the spring 28 in a compressed state. As shown in FIG. 8, the side pieces 34 are disposed between the adjacent protrusions 25 of the seat member 23, respectively.

Figure 9:
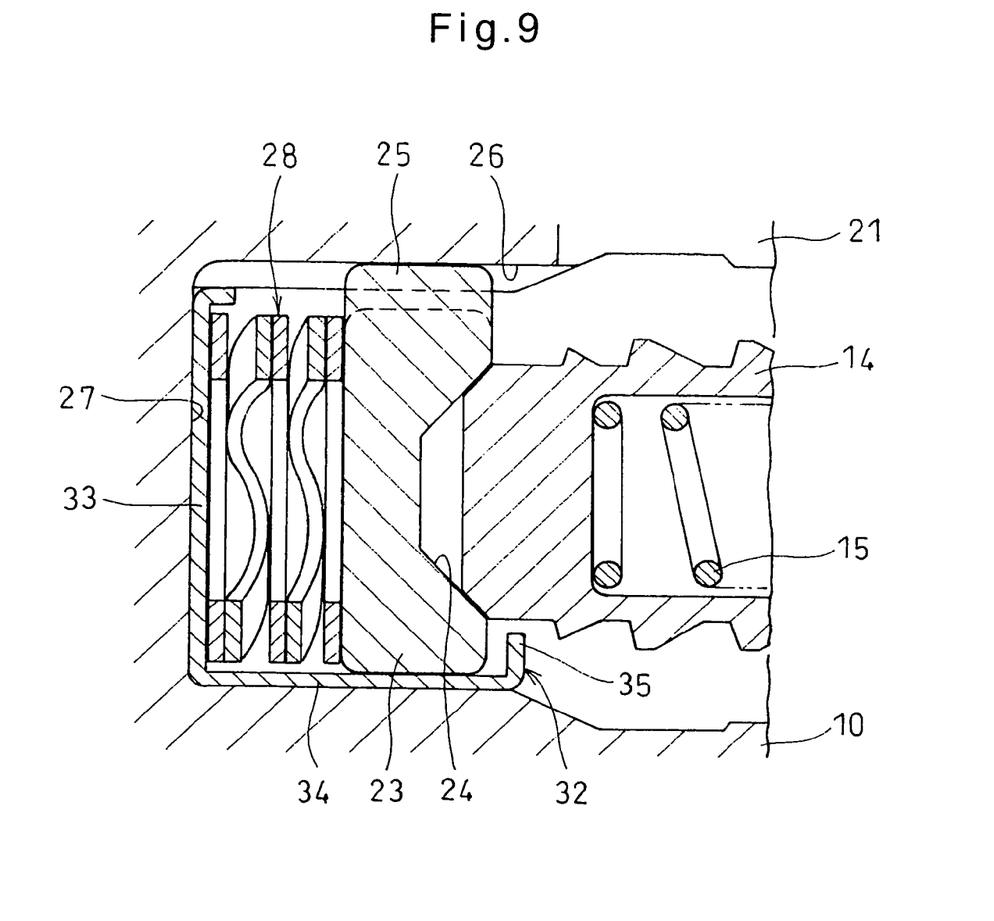
FIG. 9 is similar view to FIG. 7 and shows a state in which a pushing force applied to the plunger shown in FIG. 7 from the chain is larger than the load corresponding to the amount of compression of the spring by the holder.

In this auto-tensioner 31, if the amplitude of vibration of the chain 6 increases due to a large change in torque of the crankshaft 2, a large change in rotational resistance of the camshafts 4, or resonance of the engine during one combustion cycle to such an extent that the pushing force applied to the plunger 11 from the chain is larger than the load (preload) corresponding to the amount of compression of the spring 28 by the holder 32, the spring 28 is further compressed (as shown in FIG. 9) from the initial compressed state in which the spring 28 is compressed by the holder 32 alone, thereby absorbing vibrations of the chain 6 and preventing over-tensioning of the chain 6.

If the travel path of the chain 6 changes markedly due to thermal expansion of the engine block to such an extent that the pushing force applied to the plunger 11 from the chain is larger than the load corresponding to the amount of compression of the spring 28 by the holder 32, the spring 28 is also further compressed from the initial compressed state in which the spring 28 is compressed by the holder 32 alone, thereby absorbing such a change in the travel path of the chain 6 and preventing over-tensioning of the chain 6.

With this auto-tensioner 31, since the spring 28 is compressed beforehand, the spring 28 is not further compressed until the tension of the chain 6 exceeds the load corresponding to the amount of compression of the spring by the holder. This minimizes the possibility of resonance of the spring 28 while the vibration of the chain 6 is small, thus stabilizing the tension of the chain 6.

By changing the bending points at which the side pieces 34 of the holder 32 are bent radially inwardly to form the engaging claws 35, it is possible to adjust the amount of compression of the spring 28 by the holder.

What is claimed is:

1. An auto-tensioner comprising:
   a cylinder having an open front end and a rear end wall;
   a plunger axially slidably inserted in said cylinder, said plunger having a closed front end protruding from said cylinder and an open rear end which is located in said cylinder, said plunger having an internal thread on an inner periphery thereof;
   a screw rod having an external thread formed on an outer periphery thereof and inserted in said plunger with said external thread of said screw rod in threaded engagement with said internal thread of said plunger, said screw rod having a rear end protruding from said open rear end of said plunger;
   a seat member axially slidably mounted in said cylinder between said screw rod and said rear end wall of said cylinder so as to be in abutment with said rear end of said screw rod, said seat member being rotationally fixed to said cylinder;
   a return spring having one end thereof supported by said screw rod and biasing said plunger outwardly of the cylinder, whereby said closed front end of said plunger presses a chain or a belt;
   an elastic member mounted between said seat member and said rear end wall of said cylinder so as to be compressible in an axial direction of the cylinder, thereby supporting and biasing said seat member in the axial direction of the cylinder toward the open front end of the cylinder; and
   a holder holding said elastic member in a compressed state,
   wherein said elastic member has an axial rear end surface facing said rear end wall of said cylinder,
   wherein said seat member has an axial front end,
   and wherein said holder comprises:
      a bottom portion supporting said axial rear end surface of said elastic member;
      side pieces extending axially from an outer edge of said bottom portion toward said seat member; and
      engaging pieces extending radially inwardly from distal ends of said side pieces, respectively, and engaging said axial front end of said seat member, thereby restricting the movement of said seat member.

2. The auto-tensioner of claim 1, wherein said elastic member is a spring.

3. The auto-tensioner of claim 2, wherein said spring comprises corrugated washers and flat washers that are alternately superposed on each other.

4. The auto-tensioner of claim 1, wherein said cylinder is formed with an oil inlet for introducing engine oil that has splashed outside the cylinder into the cylinder.

5. The auto-tensioner of claim 4, wherein a film for preventing formation of a lubricating film comprising an oil additive is formed on a surface of at least one of said internal and external threads.

6. The auto-tensioner of claim 5, wherein said film is a diamond-like carbon film.

7. The auto-tensioner of claim 1, wherein each of said internal thread and said external thread has a pressure flank for supporting a pushing force applied to said plunger in a direction to push the plunger into said cylinder, and a clearance flank, said pressure flank having a flank angle larger than said clearance flank.

8. The auto-tensioner of claim 1, wherein said plunger comprises:
   a tubular member having an open front end protruding from said cylinder and a closed rear end, and having an inner periphery on which said internal thread is formed; and
   a lid member fixed to said open front end of said tubular member.

9. The auto-tensioner of claim 1, wherein said seat member includes protrusions formed on an outer periphery of said seat member, and said cylinder includes axial grooves formed in an inner periphery of said cylinder, said protrusions being engaged with said axial grooves so as to prevent rotation of said seat member relative to said cylinder.

\* \* \* \* \*